(12) United States Patent
Hamilton

(10) Patent No.: US 6,345,749 B1
(45) Date of Patent: Feb. 12, 2002

(54) RECREATIONAL VEHICLE TANK HAULING ASSEMBLY

(76) Inventor: Edward B. Hamilton, 50386 Hangtree La., Oakhurst, CA (US) 93644

( * ) Notice: Subject to any disclaimer, the term of this patent is extended or adjusted under 35 U.S.C. 154(b) by 0 days.

(21) Appl. No.: 09/612,103

(22) Filed: Jul. 7, 2000

(51) Int. Cl.[7] .................................................. B60R 9/06
(52) U.S. Cl. ........................ 224/509; 224/282; 224/509; 224/524
(58) Field of Search ............................... 224/502, 505, 224/506, 507, 509, 524, 499, 495, 553, 282, 525; 414/462

(56) References Cited

U.S. PATENT DOCUMENTS

| | | | |
|---|---|---|---|
| 3,348,713 A | * 10/1967 | Will | ........................... 414/462 |
| 3,598,296 A | * 8/1971 | Gpstomski | |
| 3,724,694 A | * 4/1973 | Wilson | |
| 3,753,520 A | * 8/1973 | Bodde | |
| 4,162,796 A | 7/1979 | Mead | |
| 4,234,284 A | * 11/1980 | Hauff | ........................... 414/462 |
| 4,434,991 A | 3/1984 | Winterton | |
| 4,813,584 A | * 3/1989 | Wiley | |
| 4,856,686 A | * 8/1989 | Workentine | |
| 4,934,894 A | * 6/1990 | White | ........................ 414/462 |
| 4,940,096 A | 7/1990 | Johnson | |
| 5,232,135 A | 8/1993 | Marren | |
| 5,346,245 A | 9/1994 | Budrow et al. | |
| 5,586,702 A | * 12/1996 | Sadler | .................... 224/495 X |
| 5,641,108 A | * 6/1997 | Ewer | ...................... 224/502 X |
| 5,680,976 A | * 10/1997 | Koliopoulos et al. | ........ 224/524 |
| 5,857,824 A | * 1/1999 | De Aquiar | .................. 414/462 |
| D409,557 S | 5/1999 | Armour | |
| 6,139,247 A | * 10/2000 | Wright | ........................ 414/462 |
| 6,193,124 B1 | * 2/2001 | Brazil et al. | ............ 414/462 X |

* cited by examiner

Primary Examiner—Gregory M. Vidovich

(57) ABSTRACT

A recreational vehicle tank hauling assembly for transporting waste tanks by automotive vehicle without requiring the waste tank to be lifted from the ground. The recreational vehicle tank hauling assembly includes a connection member adapted for coupling to a trailer hitch, an axle extending from the connection member, a deck assembly rotatably coupled to the axle, and a pin for securing the rotation of the deck with respect to the axle.

8 Claims, 2 Drawing Sheets

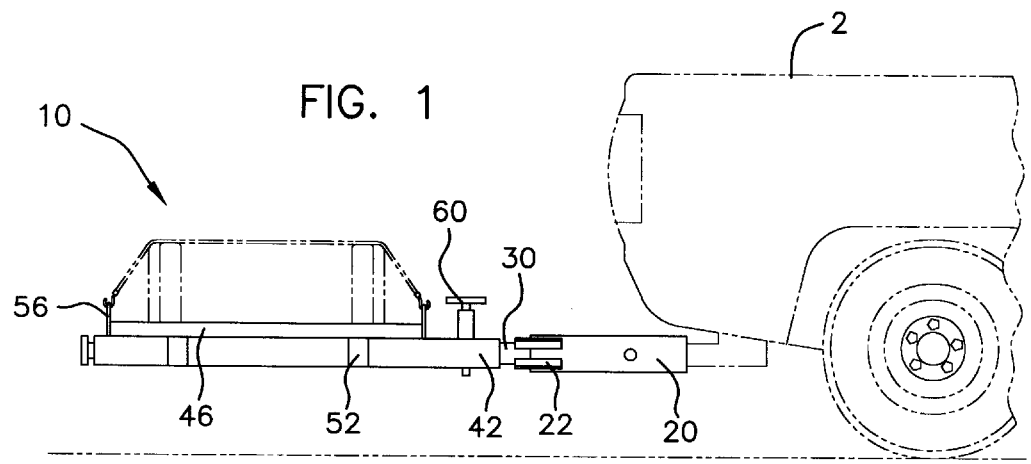
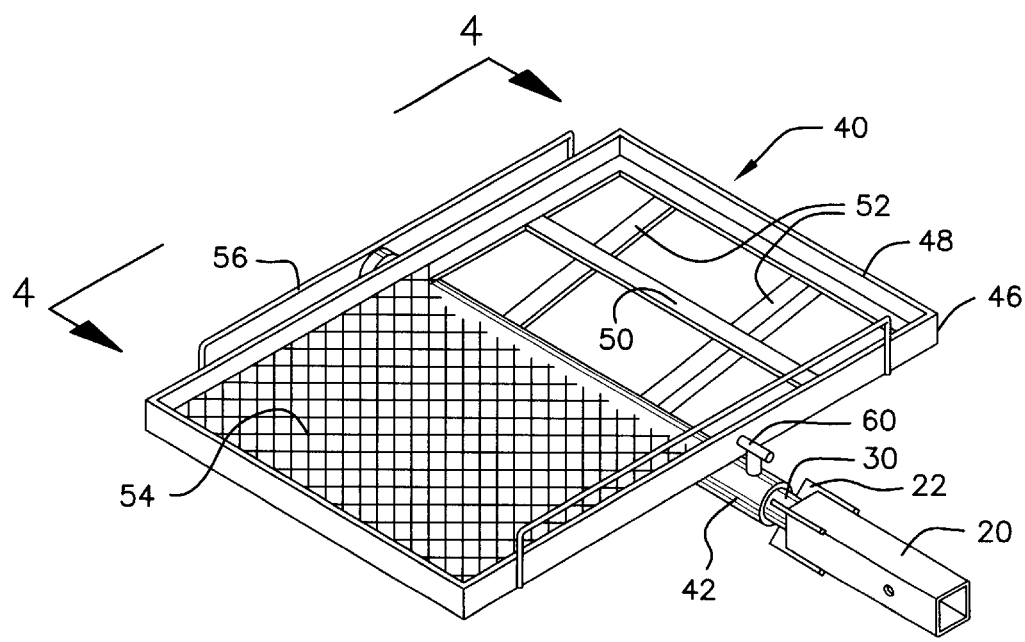

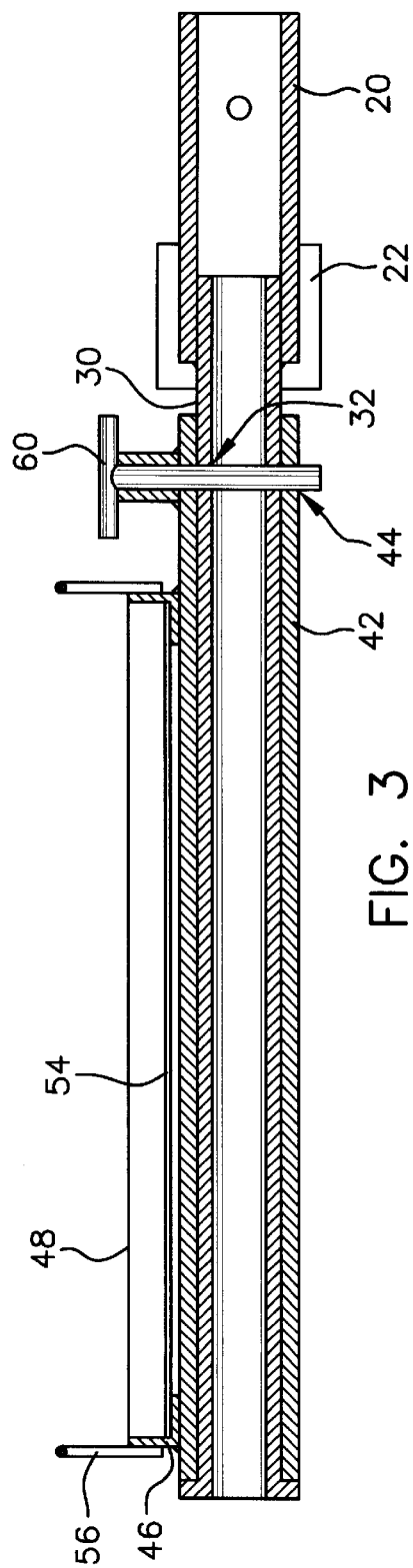
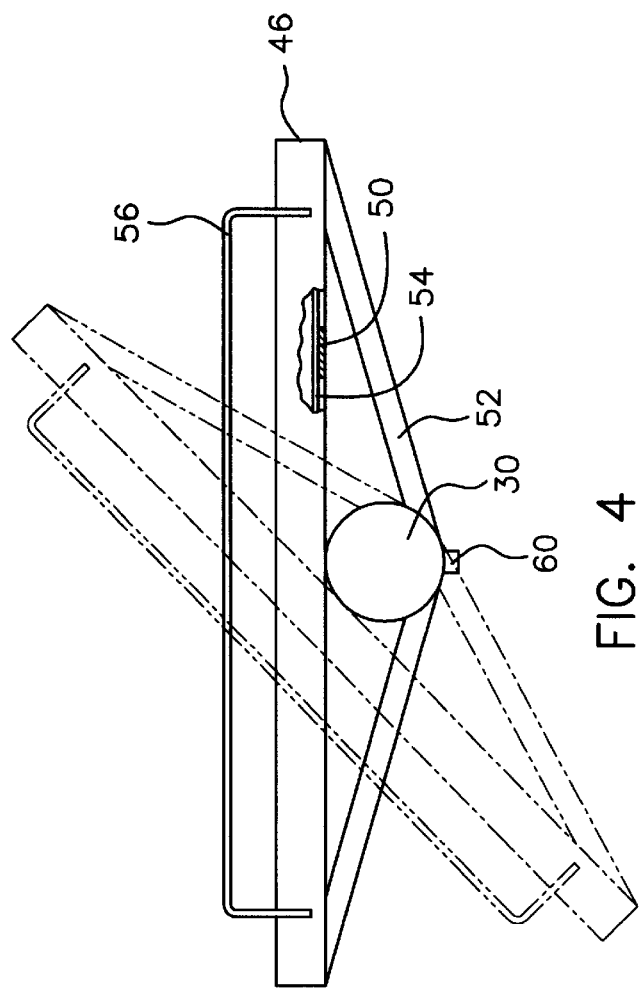

RECREATIONAL VEHICLE TANK HAULING ASSEMBLY

BACKGROUND OF THE INVENTION

1. Field of the Invention

The present invention relates to cargo platforms and more particularly pertains to a new recreational vehicle tank hauling assembly for transporting waste tanks by automotive vehicle without requiring the waste tank to be lifted from the ground.

2. Description of the Prior Art

The use of cargo platforms is known in the prior art. More specifically, cargo platforms heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,162,796; U.S. Pat. No. 5,346,245; U.S. Pat. No. 5,232,135; U.S. Pat. No. 4,434,991; U.S. Pat. No. 4,940,096; and U.S. Pat. No. Des. 409,557.

While these devices fulfill their respective, particular objectives and requirements, the aforementioned patents do not disclose a new recreational vehicle tank hauling assembly. The inventive device includes a connection member adapted for coupling to a trailer hitch, an axle extending from the connection member, a deck assembly rotatably coupled to the axle, and a pin for securing the rotation of the deck with respect to the axle.

In these respects, the recreational vehicle tank hauling assembly according to the present invention substantially departs from the conventional concepts and designs of the prior art, and in so doing provides an apparatus primarily developed for the purpose of transporting waste tanks by automotive vehicle without requiring the waste tank to be lifted from the ground.

SUMMARY OF THE INVENTION

In view of the foregoing disadvantages inherent in the known types of cargo platforms now present in the prior art, the present invention provides a new recreational vehicle tank hauling assembly construction wherein the same can be utilized for transporting waste tanks by automotive vehicle without requiring the waste tank to be lifted from the ground.

The general purpose of the present invention, which will be described subsequently in greater detail, is to provide a new recreational vehicle tank hauling assembly apparatus and method which has many of the advantages of the cargo platforms mentioned heretofore and many novel features that result in a new recreational vehicle tank hauling assembly which is not anticipated, rendered obvious, suggested, or even implied by any of the prior art cargo platforms, either alone or in any combination thereof.

To attain this, the present invention generally comprises a connection member adapted for coupling to a trailer hitch, an axle extending from the connection member, a deck assembly rotatably coupled to the axle, and a pin for securing the rotation of the deck with respect to the axle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new recreational vehicle tank hauling assembly apparatus and method which has many of the advantages of the cargo platforms mentioned heretofore and many novel features that result in a new recreational vehicle tank hauling assembly which is not anticipated, rendered obvious, suggested, or even implied by any of the prior art cargo platforms, either alone or in any combination thereof.

It is another object of the present invention to provide a new recreational vehicle tank hauling assembly which may be easily and efficiently manufactured and marketed.

It is a further object of the present invention to provide a new recreational vehicle tank hauling assembly which is of a durable and reliable construction.

An even further object of the present invention is to provide a new recreational vehicle tank hauling assembly which is susceptible of a low cost of manufacture with regard to both materials and labor, and which accordingly is then susceptible of low prices of sale to the consuming public, thereby making such recreational vehicle tank hauling assembly economically available to the buying public.

Still yet another object of the present invention is to provide a new recreational vehicle tank hauling assembly which provides in the apparatuses and methods of the prior art some of the advantages thereof, while simultaneously overcoming some of the disadvantages normally associated therewith.

Still another object of the present invention is to provide a new recreational vehicle tank hauling assembly for transporting waste tanks by automotive vehicle without requiring the waste tank to be lifted from the ground.

Yet another object of the present invention is to provide a new recreational vehicle tank hauling assembly which includes a connection member adapted for coupling to a trailer hitch, an axle extending from the connection member, a deck assembly rotatably coupled to the axle, and a pin for securing the rotation of the deck with respect to the axle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view of a new recreational vehicle tank hauling assembly according to the present invention.

FIG. 2 is a schematic perspective view of the present invention.

FIG. 3 is a schematic cross-sectional view of the present invention.

FIG. 4 is a schematic rear view of the present invention taken along line 4—4 of FIG. 2.

DESCRIPTION OF THE PREFERRED EMBODIMENT

With reference now to the drawings, and in particular to FIGS. 1 through 4 thereof, a new recreational vehicle tank hauling assembly embodying the principles and concepts of the present invention and generally designated by the reference numeral 10 will be described.

As best illustrated in FIGS. 1 through 4, the recreational vehicle tank hauling assembly 10 generally comprises a connection member 20, an axle 30, a deck assembly 40, and a pin 60.

The connection member 20 includes a generally square cross section taken transverse to a longitudinal axis of the connection member 20. The connection member 20 is designed for coupling to a trailer hitch of a vehicle 2.

The axle 30 includes a generally circular cross section taken transverse to a longitudinal axis of the axle 30. The axle 30 extends from the connection member 20. The axle 30 includes a pair of aligned pin apertures 32. The pin apertures 32 are substantially vertically aligned when the connection member 20 is coupled to the trailer hitch of the vehicle 2.

A plurality of generally L-shaped bracing members 22 is coupled to the connection member 20. Each of the bracing members 22 includes a first portion extending along an associated corner edge of the connection member 20. Each of the bracing members 22 includes a second portion extending from a distal end of the connection member 20. Each second portion is fixedly coupled to the axle 30 for preventing twisting of the axle relative to the connection member 20 during use.

The deck assembly 40 is rotationally coupled to the axle 30 for permitting tilting of the deck assembly 40 relative to the axle 30 such that the outer sides of the deck assembly 40 are designed for contacting a ground surface for facilitating loading and unloading of a recreational vehicle tank from the deck assembly 40. The deck assembly 40 includes: a collar member 42, a frame portion 46, a plurality of cross members 50, a plurality of support members 52, a planar deck member 54, and a plurality of connection rails 56.

The frame portion 46 is generally rectangular.

Each of the cross members 50 extends between a first pair of opposite sides of the frame portion 46. Each of the cross members 50 is substantially coplanar with a lower surface of the frame portion 46.

Each of the support members 52 extends between a second pair of opposite sides of the frame portion 46. A medial portion of each of the support members 52 is bent such that the medial portion passes underneath the axle 30.

Each of the connection rails 56 is coupled to an associated side of the frame portion 46. Each of the connection rails 56 extends upwardly from the frame portions 46 such that each connection rail 56 is designed for receiving a hook from a tie-down strap.

A circumferential lip 48 extends upwardly from an outer perimeter edge of the frame portion 46. The lip 48 extends upwardly around the deck member 54. Thus the deck assembly 40 is designed for holding a tank from a recreational vehicle.

The collar member 42 includes a generally circular cross-section transverse to a longitudinal axis of the collar member 42. The collar member 42 includes a pair of aligned holes 44. The aligned holes 44 can be aligned with the pin apertures 32 of the axle 30.

The pin 60 is used for inserting through the holes 44 of the collar member and the pin apertures 32 for preventing rotation of the deck assembly 40 relative to the axle 30 when the pin 60 is inserted through the holes 44 of the collar member 42 and the pin apertures 32 of the axle 30.

In use, the recreational vehicle tank hauling assembly would be coupled to a vehicle. The pin would be removed from the holes and pin apertures aloowing the deck assembly to rotate from a substantially horizontal position to an inclined position such that one side of the frame portion contacts the ground surface. A waste tank would then be rolled adaject to the deck assembly such that the bottom surface of the waste tank contacts the to surface of the deck assembly. The user then straps the tank to the deck assembly in a conventional manner such as tie-down straps. The deck assembly is then rotated again to the horizontal position and the pin replaced through the holes and apertures.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A recreational vehicle tank hauling assembly comprising:
   a connection member adapted for coupling to a trailer hitch of a vehicle;
   an axle extending from said connection member, said axle having a pin aperture;
   a deck assembly rotationally coupled to said axle, said deck assembly including a collar member, said collar member having a hole alignable with said pin aperture of said axle; and
   a pin for inserting through said hole of said collar member and said pin aperture for preventing rotation of said deck assembly relative to said axle when said pin is inserted through said hole of said collar member and said pin aperture;
   said connection member having a generally square cross section taken transverse to a longitudinal axis of said connection member, said connection member being adapted for coupling to a trailer hitch of a vehicle;
   said axle having a generally circular cross section taken transverse to a longitudinal axis of said axle, said axle extending from said connection member, said pin aperture being a pair of aligned pin apertures, said pin apertures being substantially vertically aligned when said connection member is coupled to the trailer hitch of the vehicle;
   a plurality of generally L-shaped bracing members, each of said bracing members having a first portion extending along an associated corner edge of said connection member, each of said bracing members having a second portion extending from a distal end of said connection member, each second portion being fixedly coupled to said axle for preventing twisting of said axle relative to said connection member during use; and
   said deck assembly rotationally coupled to said axle for permitting tilting of said deck assembly relative to said axle such that outer sides of said deck assembly are adapted for contacting a ground surface for facilitating loading and unloading of a recreational vehicle tank from said deck assembly, said deck assembly including a frame portion, a plurality of cross members, a plurality of support members, a planar deck member, and a plurality of connection rails.

2. The recreational vehicle tank hauling assembly of claim 1, further comprising:
   said frame portion being generally rectangular;
   each of said cross members extending between a first pair of opposite sides of said frame portion, each of said cross members being substantially coplanar with a lower surface of said frame portion;
   each of said support members extending between a second pair of opposite sides of said frame portion, a medial portion of each of said support members being bent such that said medial portion passes underneath said axle.

3. The recreational vehicle tank hauling assembly of claim 1, further comprising:
   each of said connection rails being coupled to an associated side of said frame portion, each of said connection rails extending upwardly from said frame portion such that each said connection rail is adapted for receiving a hook from a tie-down strap.

4. The recreational vehicle tank hauling assembly of claim 1, further comprising:
   a circumferential lip extending upwardly from an outer perimeter edge of said frame portion, said lip extending upwardly around said deck portion whereby said deck assembly is adapted for holding a tank from a recreational vehicle.

5. The recreational vehicle tank hauling assembly of claim 1, further comprising:
   said collar member having a generally circular cross-section transverse to a longitudinal axis of said collar member, said hole being a pair of aligned holes, said aligned holes being alignable with said pin apertures of said axle; and
   said pin being for inserting through said holes of said collar member and said pin apertures for preventing rotation of said deck assembly relative to said axle when said pin is inserted through said holes of said collar member and said pin apertures of said axle.

6. The recreational vehicle tank hauling assembly of claim 1, further comprising:
   said frame portion being generally rectangular;
   each of said cross members extending between a first pair of opposite sides of said frame portion, each of said cross members being substantially coplanar with a lower surface of said frame portion;
   each of said support members extending between a second pair of opposite sides of said frame portion, a medial portion of each of said support members being bent such that said medial portion passes underneath said axle;
   each of said connection rails being coupled to an associated side of said frame portion, each of said connection rails extending upwardly from said frame portion such that each said connection rail is adapted for receiving a hook from a tie-down strap;
   a circumferential lip extending upwardly from an outer perimeter edge of said frame portion, said lip extending upwardly around said deck portion whereby said deck assembly is adapted for holding a tank from a recreational vehicle.

7. The recreational vehicle tank hauling assembly of claim 6, further comprising:
   said collar member having a generally circular cross-section transverse to a longitudinal axis of said collar member, said hole being a pair of aligned holes, said aligned holes being alignable with said pin apertures of said axle; and
   said pin being for inserting through said holes of said collar member and said pin apertures for preventing rotation of said deck assembly relative to said axle when said pin is inserted through said holes of said collar member and said pin apertures of said axle.

8. A recreational vehicle tank hauling assembly comprising:
   a connection member having a generally square cross section taken transverse to a longitudinal axis of said connection member, said connection member being adapted for coupling to a trailer hitch of a vehicle;
   an axle having a generally circular cross section taken transverse to a longitudinal axis of said axle, said axle extending from said connection member, said axle having a pair of aligned pin apertures, said pin apertures being substantially vertically aligned when said connection member is coupled to the trailer hitch of the vehicle;
   a plurality of generally L-shaped bracing members, each of said bracing members having a first portion extending along an associated corner edge of said connection member, each of said bracing members having a second portion extending from a distal end of said connection member, each second portion being fixedly coupled to said axle for preventing twisting of said axle relative to said connection member during use;

a deck assembly rotationally coupled to said axle for permitting tilting of said deck assembly relative to said axle such that an outer sides of said deck assembly are adapted for contacting a ground surface for facilitating loading and unloading of a recreational vehicle tank from said deck assembly, said deck assembly including a collar member, a frame portion, a plurality of cross members, a plurality of support members, a planar deck member, and a plurality of connection rails;

said frame portion being generally rectangular;

each of said cross members extending between a first pair of opposite sides of said frame portion, each of said cross members being substantially coplanar with a lower surface of said frame portion;

each of said support members extending between a second pair of opposite sides of said frame portion, a medial portion of each of said support members being bent such that said medial portion passes underneath said axle;

each of said connection rails being coupled to an associated side of said frame portion, each of said connection rails extending upwardly from said frame portion such that each said connection rail is adapted for receiving a hook from a tie-down strap;

a circumferential lip extending upwardly from an outer perimeter edge of said frame portion, said lip extending upwardly around said deck portion whereby said deck assembly is adapted for holding a tank from a recreational vehicle;

said collar member having a generally circular cross-section transverse to a longitudinal axis of said collar member, said collar member having a pair of aligned holes, said aligned holes being alignable with said pin apertures of said axle; and a pin for inserting through said holes of said collar member and said pin apertures for preventing rotation of said deck assembly relative to said axle when said pin is inserted through said holes of said collar member and said pin apertures of said axle.

* * * * *